United States Patent
Uyama

Patent Number: 5,373,776
Date of Patent: Dec. 20, 1994

[54] VALVE MECHANISM FOR BOOSTER

[75] Inventor: Shintaro Uyama, Saitama, Japan

[73] Assignee: Jidosha Kiki Co., Ltd., Tokyo, Japan

[21] Appl. No.: 69,021

[22] Filed: May 28, 1993

[30] Foreign Application Priority Data

Jun. 29, 1992 [JP] Japan ................. 4-194841

[51] Int. Cl.$^5$ .............................................. F15B 9/10
[52] U.S. Cl. .............................................. 91/376 R
[58] Field of Search ............... 91/369.1, 369.2, 369.3, 91/369.4, 376 R

[56] References Cited

U.S. PATENT DOCUMENTS

| | | | |
|---|---|---|---|
| 3,813,992 | 6/1974 | Brown | 91/369.4 |
| 4,633,760 | 1/1987 | Wagner | 91/369.3 |
| 4,729,284 | 3/1988 | Gautier | 91/376 R |
| 5,027,695 | 7/1991 | Inuoe et al. | 91/369.2 |
| 5,121,674 | 6/1992 | Uyama | 91/369.3 |
| 5,146,837 | 9/1992 | Inoue | |

FOREIGN PATENT DOCUMENTS 2417384  6/1975  Germany ............................ 91/376 R

*Primary Examiner*—Edward K. Look
*Assistant Examiner*—F. Daniel Lopez
*Attorney, Agent, or Firm*—Flynn, Thiel, Boutell & Tanis

[57] ABSTRACT

A valve mechanism for a brake or clutch booster, and more particularly, an improvement of a valve element used therein is disclosed. The valve element includes a seat which is located at the front end, a connection located at the rear end and connected to the inner periphery of a valve body, and a curved portion which is axially collapsible and interconnecting between the seat and the connection. An annular groove is formed in the inner peripheral surface of the connection at its front end. With this arrangement, the provision of the annular groove is effective to prevent any reduction in the flexibility of the curved portion if the diameter of the seat of the valve element is increased in order to increase the flow rate of the atmosphere into the booster. Thus, if the diameter of the seat 10a of the valve element 10 is increased, there is no need to increase the diameter of the connection 10b of the valve element 10. This permits the pressure responsive area of the curved portion which is subject to a pressure differential when the booster is inoperative to be reduced. Accordingly, any resulting increase in the set loading upon a coiled spring which is used to return an input shaft to its inoperative position can be minimized. In this manner, the response of the booster can be improved without impairing a brake feeling experienced by a driver.

3 Claims, 1 Drawing Sheet

VALVE MECHANISM FOR BOOSTER

FIELD OF THE INVENTION

The invention relates to a valve mechanism for a brake or clutch booster, or more particularly, to an improvement of a valve element thereof.

DESCRIPTION OF THE PRIOR ART

A booster is known in the art which comprises a valve body disposed to be reciprocable within a shell, a power piston disposed in the valve body, a constant and a variable pressure chamber formed across the power piston, a pressure passage formed around the inner periphery of the valve body, and a valve mechanism received within the valve body for switching a fluid circuit between the constant pressure chamber, the variable pressure chamber and the pressure passage. The valve mechanism comprises an annular, first valve seat formed on a valve plunger which is slidably fitted in an axial portion of the valve body, an annular, second valve seat formed around the inner periphery of the valve body in surrounding relationship with the first valve seat, a substantially cylindrical valve element which is adapted to be seated upon either valve seat, a first coiled spring for urging the valve element toward the both valve seats, and a second coiled spring disposed between the inner periphery of the valve body and an input shaft which is connected to the valve plunger for returning the input shaft to its inoperative position. The valve element includes an annular seat which is located axially foremost and adapted to be seated upon either valve seat, a connection which is located axially rearmost and mounted on the inner periphery of the valve body, and a curved section which is axially collapsible and interconnecting between the seat and the connection.

In a conventional booster as mentioned above, the connection of the valve element has an outer diameter which is greater than that of the seat, and the connection is mounted on the inner periphery of the valve body while the curved section has a reduced wall thickness so as to be axially collapsible. In other words, the curved section has a diameter at its front end which is reduced relative to the diameter at its rear end.

When such a conventional booster is inoperative, the seat of the valve element is removed from the second valve seat and is seated upon the first valve seat which is located inwardly thereof. Accordingly, the atmosphere, which acts as a pressure fluid entering the pressure passage, is allowed to reach the inner periphery of the valve element, but is prevented from being introduced into the variable pressure chamber by the seat of the valve element which is seated upon the first valve seat. On the other hand, under the inoperative condition mentioned above, the variable pressure chamber communicates with the constant pressure chamber, and a negative pressure is introduced therein. Accordingly, when the booster is inoperative, there is a pressure differential across the inner and the outer periphery of the valve element, whereby the curved section of the valve element is urged to extend in a radially outward direction and in the axially forward direction.

Recently, there is a trend to increase the flow rate of the atmosphere, acting as the pressure fluid, by increasing the diameter of the seat of the valve element in an attempt to improve the response of the booster. However, when the diameter of the seat of the valve element is increased, this necessarily results in an increased diameter at the front end of the curved section to reduce a difference in the diameter between the front and the rear end of the curved section, which reduces the flexibility and hence the collapsing movement of the curved section. To correct for this, the diameter of the connection as well as the seat of the valve element must be increased in order to maintain an improved flexibility of the curved section. However, when the diameter of the entire valve element is increased, the pressure responsive area of the curved section of the valve element which is subject to the pressure differential when the booster is inoperative increases. This necessitates a loading set upon the second coiled spring, which serves returning the input shaft to its inoperative operation, to be increased, which in turn increases the magnitude of force of the depression which must be applied to a brake pedal when actuating the booster, thus disadvantageously degrading a brake feeling of a driver.

SUMMARY OF THE INVENTION

Accordingly, it is an object of the invention to improve the response of the booster without impairing the brake feeling.

The invention relates to a booster comprising a valve body which is disposed to be reciprocable within a shell, a power piston mounted on the valve body, a constant and a variable pressure chamber formed across the power piston, a pressure passage formed within the inner periphery of the valve body, and a valve mechanism disposed within the valve body for switching a fluid circuit between the constant pressure chamber, the variable pressure chamber and the pressure passage, the valve mechanism including an annular, first valve seat formed on a valve plunger slidably fitted in an axial portion of the valve body, an annular, second valve seat formed around the inner periphery of the valve body in surrounding relationship with the first valve seat, a substantially cylindrical valve element adapted to be seated upon either valve seat, a first coiled spring for urging the valve element toward the both valve seats, and a second coiled spring disposed between the inner periphery of the valve body and an input shaft connected to the valve plunger for returning the input shaft to its inoperative position, the valve element including an annular seat which is located axially foremost and adapted to be seated upon either valve seat, a connection which is located axially rearmost and adapted to be mounted on the inner periphery of the valve body, and a curved section which is axially collapsible and interconnecting between the seat and the connection. In accordance with the invention, an annular groove is formed in the inner peripheral surface of the valve element at the front end of the connection.

With this arrangement, the annular groove which is formed in the inner periphery of the connection prevents a reduction in the flexibility of the curved section if the diameter of the seat of the valve element is increased, thus eliminating the need to increase the diameter of the connection of the valve element. Accordingly, there is no need to increase the diameter of the curved section at its rear end if the diameter of the curved section at its front end is increased as a consequence of increasing the diameter of the seat of the valve element. This prevents an increase in the pressure responsive area of the curved section of the valve element which is subject to a pressure differential when the booster is inoperative from occurring. This allows an increase in the set loading upon the second coiled spring to be minimized if the diameter of the seat of the valve element is increased in order to increase the flow rate of the pressure fluid, while avoiding any impairment of the brake feeling. In this manner, the response of the booster can be improved without impairing the brake feeling experienced by a driver.

Above and other objects, features and advantages of the invention will become apparent from the following description of an embodiment thereof with reference to the drawing.

DETAILED DESCRIPTION OF EMBODIMENT

Figure 1:
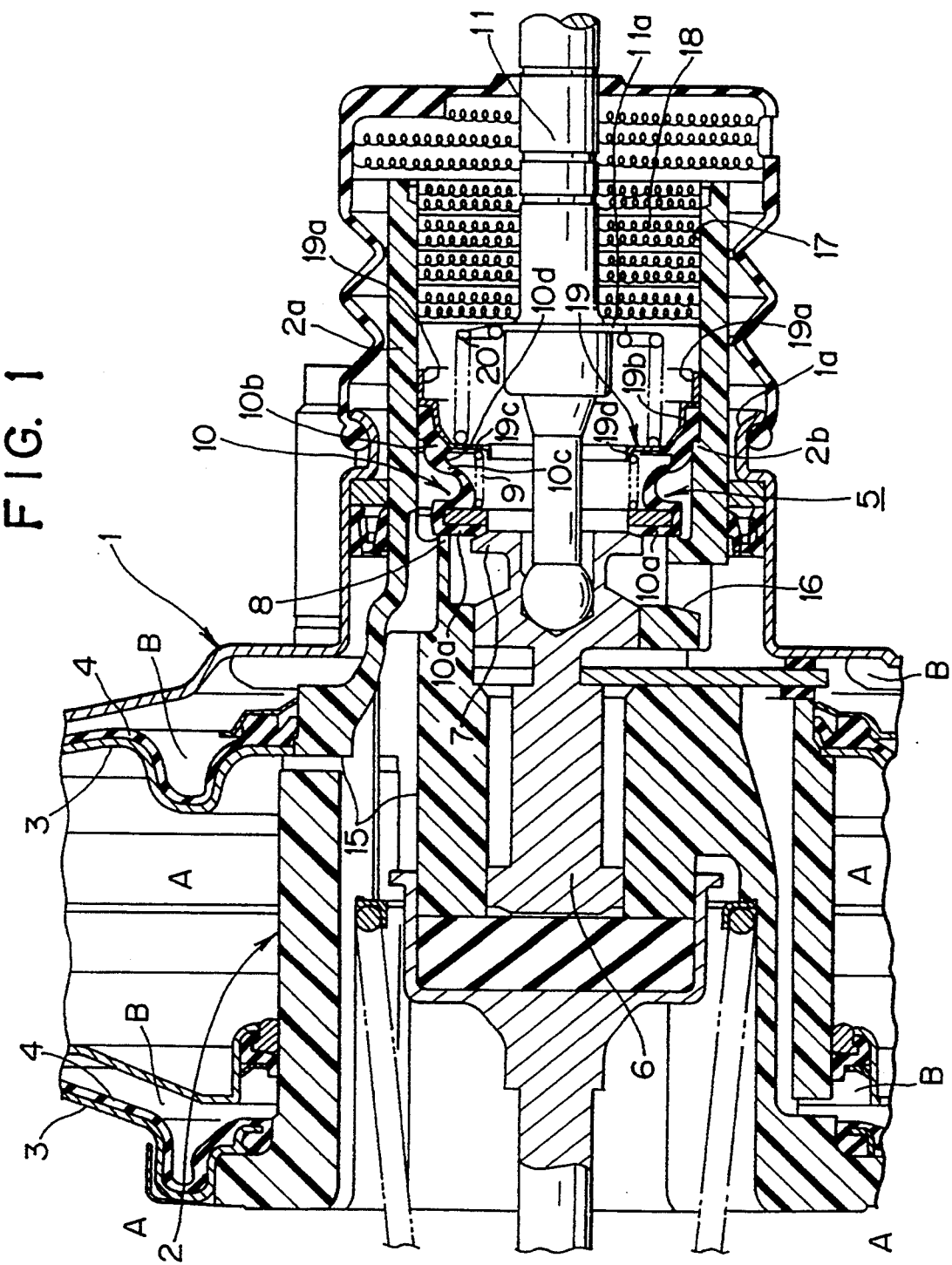
FIG. 1 is a longitudinal section showing one embodiment of the invention.

Referring to the single drawing to describe an embodiment of the invention, there is shown an essential part of a brake booster of tandem type including a shell 1 in which a substantially tubular valve body 2 is slidably disposed. The valve body 2 includes a tubular portion 2a at its rear portion which projects to the exterior through an opening 1a formed in the shell 1.

A power piston 3 is mounted around the outer periphery of the valve body 2, and a diaphragm 4 is applied to the back surface of the power piston, thus defining a constant pressure chamber A and a variable pressure chamber B across the power piston 3.

A valve mechanism 5, which is known in itself, is received within the tubular portion 2a of the valve body 2, and functions to switch the variable pressure chamber B between the constant pressure chamber A, and the atmosphere.

The valve mechanism 5 comprises a valve plunger 6 slidably fitted within the valve body 2, an annular, first valve seat 7 formed on the valve plunger 6, an annular second valve seat 8 formed on the valve body 2 in surrounding relationship with the first valve seat 7, and a valve element 10 which is urged by the resilience of a first coiled spring 9 from the right, as viewed in FIG. 1, to be seated upon either valve seat 7 or 8. The rear end of the valve plunger 6 is connected to an input shaft 11 which is mechanically coupled to a brake pedal, not shown, thereby allowing the valve mechanism 5 to be actuated in response to the input shaft 11.

A space located radially outward of a seat 10a defined between the second valve seat 8 and the valve element 10 communicates with the constant pressure chamber A through an axial constant pressure passage 15 formed in the valve body 2, and a negative pressure is normally introduced into the constant pressure chamber A and the constant pressure passage 15. On the other hand, a space located radially inward of the seat 10a defined between the second valve seat 8 and the valve element 10, but radialy outward of a seat 10a defined between the first valve seat 7 and the valve element 10 communicates with the variable pressure chabmer B through a radial variable pressure passage 16 also formed in the valve body 2.

Finally, a space located radially inward of the seat 10a defined between the first valve seat 7 and the valve element 10 communicates with the atmosphere through a pressure passage 17 formed by a clearance between the inner peripheral surface of the tubular portion 2a of the valve body 2 and the outer peripheral surface of the input shaft 11, and through a filter 18 which is disposed to cover the pressure passage 17.

The valve element 10 is generally tubular, and includes an annular portion at its left end which serves as the seat 10a to be seated upon either valve seat 7 or 8. At its right end, the valve element 10 includes a connection 10b, which is secured against a step 2b of the tubular portion 2a by means of a retainer 19. The seat 10a and the connection 10b are interconnected by a curved section 10c, which can be axially collapsed to move the seat 10a toward or away from either valve seat 7 or 8.

The first coiled spring 9 is disposed between the retainer 19 and the valve element 10 to urge the seat 10a of the valve element 10 toward the both valve seats 7, 8. A second coiled spring 20 having a greater resilience than the first coiled spring 9 is disposed between the retainer 19 and a step 11a formed on the input shaft 11 to secure the retainer 19 in place against the tubular portion 2a and to urge the input shaft 11 rearward to maintain it in its inoperative position shown.

In the inoperative condition of the brake booster shown in FIG. 1, the seat 10a of the valve element 10 is seated upon the first valve seat 7 and is simultaneously removed from the second valve seat 8. Accordingly, the atmosphere acting as a pressure fluid which has found its way into the pressure passage 17 flows to the inner periphery of the valve element 10, but is prevented from being introduced into the variable pressure chamber B by the cooperation between the first valve seat 7 and the seat 10a of the valve element which is seated thereupon. On the other hand, under this condition, the variable pressure chamber B and the constant pressure chamber A communicate with each other, and a negative pressure is introduced therein, so that there is a pressure differential across the inner and the outer periphery of the valve element 10 due to the atmospheric pressure and the negative pressure applied thereto, and accordingly, the curved section 10c and the seat 10a of the valve element 10 are urged to expand in the radial and the axially forward direction, respectively.

In the present embodiment, the connection 10b of the valve element has a wall thickness on the order of nearly thrice the wall thickness of the curved section 10c, and an annular groove 10d is formed in the inner peripheral surface of the thickened connection 10b in its boundary region with the curved section 10c.

The retainer, which is in the form of a stepped tubular configuration, has a rear end which is formed as a tubular portion 19a of an increased diameter having an external diameter less than the internal diameter of the tubular portion 2a of the valve body 2 which defines the pressure passage 17 so as to be loosely fitted in the tubular portion 2a. Hence, the tubular portion 19a of the retainer 19 is movable along the inner peripheral surface of the tubular portion 2a of the valve body 2. Adjacent to and forwardly of the tubular portion 19a, the retainer 19 includes a first tapered portion 19b having a diameter which reduces in the forward direction and which is formed as two contiguous portions, a rear portion presenting a gentle taper and a front portion presenting a sharp taper. The front end of the first tapered portion 19b extends radially inward to provide a radial support 19c. A second tapered portion 19d having a diameter which reduces toward the front side is formed around the inner periphery of the support 19c and defines the inner peripheral edge of the retainer 19.

The outer peripheral surface of the first tapered portion 19b of the retainer 19 is disposed as a press fit against the connection 10b of the valve element 10 from the rear side, and simultaneously an end face defined by a step between the tubular portion 19a and the tapered portion 19b is disposed in abutment against the connection 10b from the rear side, thereby holding the connection 10b of the valve element in abutment against the step 2b of the tubular portion 2a to secure it in place.

The first coiled spring 9 is disposed between the support 19c of the retainer 19 thus disposed and the back side of the seat 10a of the valve element 10 while the second coiled spring 20 which is preset to a higher loading than the first coiled spring 9 is disposed between the support 19c of the retainer 19 and the step 11a of the input shaft 11. The second coiled spring 20 urges the retainer 19 against the connection 10b of the valve element 10 while simultaneously urging the input shaft 11 rearward to return it to its inoperative position.

In the present embodiment, both the first and the second coiled spring 9, 20 are cylindrical in configuration, and accordingly the atmosphere which finds its way into the pressure passage 17 flows through the inner space within the both coiled springs 9, 20.

With the valve element 10 constructed in the manner mentioned above, if the diameter of the seat 10a of the valve element 10 is increased in order to increase the flow rate of the atmosphere, the provision of the annular groove 10d is effective to prevent a reduction in the flexibility of the curved section 10c. Accordingly, the diameter of the connection 10b of the valve element need not be increased if the diameter of the seat 10a of the valve element 10 is increased. In other words, when the diameter of the seat 10a of the valve element 10 is increased, the diameter of the curved section 10c must necessarily be increased in its front region, but the diameter of the curved section 10c need not be increased in its rear region where it is connected to the connection 10b. In this manner, an increase in the pressure responsive area of the curved section of the valve element 10 which is subject to a pressure differential when the brake booster is inoperative can be prevented if the diameter of the seat 10a of the valve element 10 is increased.

This allows any increase in the loading which is required for the second coiled spring 20 to be suppressed, thus avoiding any impairment of a brake feeling experienced by a driver. Thus, the diameter of the seat 10a of the valve element 10 may be increased to increase the flow rate of the atmosphere in order to improve the response of the brake booster.

In the present embodiment, the tubular portion 19a having an increased diameter of the retainer 19 is loosely fitted in the tubular portion 2a of the valve body 2, and accordingly the retainer 19 may be manufactured to a less stringent tolerance and can be easily assembled.

While the invention has been disclosed above in connection with a preferred embodiment thereof, it should be understood that a number of changes, modifications and substitutions therein will readily occur to one skilled in the art from the above disclosure without departing from the spirit and scope of the invention defined by the appended claims.

What is claimed is:

1. In a booster comprising a valve body which is disposed to be reciprocable in a shell, a power piston mounted on the valve body, a constant pressure chamber and a variable pressure chamber formed across the power piston, a pressure passage formed within an inner periphery of the valve body, and a valve mechanism received within the valve body for switching the variable pressure chamber between the constant pressure chamber and the pressure passage;

the valve mechanism including an annular, first valve seat formed on a valve plunger slidably fitted in an axial portion of the valve body, an annular, second valve seat formed on the inner periphery of the valve body in surrounding relationship with the first valve seat, a substantially cylindrical valve element adapted to be seated upon either valve seat, a first coiled spring for urging the valve element toward the both valve seats, and a second coiled spring disposed between the inner periphery of the valve body and an input shaft connected to the valve plunger for returning the input shaft to its inoperative position;

the valve element including an annular seat which is located axially foremost and adapted to be seated upon either valve seat, a connection which is located axially rearmost and mounted on the inner periphery of the valve body, and a curved portion which is axially collapsible and interconnecting between the seat and the connection;

a valve mechanism for the booster characterized by an annular groove formed in an inner peripheral surface of the connection of the valve element toward its front end;

said connection of said valve element being disposed proximate an annular step disposed on an inner peripheral surface of said valve body and being secured to said annular step by a stepped tubular retainer, said tubular retainer comprising a tubular portion of an increased diameter which is formed at a rear end of the retainer, a first tapered section located adjacent to and forwardly of the tubular portion and presenting a taper which changes in two steps, a radial support located adjacent to and forwardly of the first tapered section, and a second tapered portion extending from an inner peripheral edge of said support, an outer peripheral surface of the first tapered section being disposed as a press fit in the inner peripheral surface of the connection at its rear end while simultaneously disposing an end face of a step formed at a front end of the tubular portion in abutment against the connection of the valve element from a rear side to secure the connection of the valve element against the annular step of the valve body, the first coiled spring being disposed between the radial support of the retainer and a back side of the annular seat of the valve element which is located forwardly of the radial support, the second coiled spring being disposed between the radial support of the retainer and a step on the input shaft which is located rearward of the radial support.

2. A valve mechanism according to claim 1 in which the connection of the valve element has a wall thickness on the order of nearly thrice the wall thickness of the curved portion, and the tubular portion of the retainer having an external diameter which is less than the internal diameter of the valve body at a location rearward of the step where the connection is secured.

3. A valve mechanism according to claim 2 in which the first and second coiled springs are generally tubular in configuration to allow a pressure fluid to pass through the inside of the first and second coiled springs, a set loading of the second coiled spring being higher than a set loading of the first coiled spring.

* * * * *